United States Patent
Langwald

(10) Patent No.: US 7,334,671 B2
(45) Date of Patent: Feb. 26, 2008

(54) ACTUATING DEVICE FOR A CLUTCH

(75) Inventor: Olaf Langwald, Neukirch (DE)

(73) Assignee: ZF Friedrichshafen AG, Friedrichshafen (DE)

( * ) Notice: Subject to any disclaimer, the term of this patent is extended or adjusted under 35 U.S.C. 154(b) by 211 days.

(21) Appl. No.: 10/529,996

(22) PCT Filed: Oct. 11, 2003

(86) PCT No.: PCT/EP03/11280

§ 371 (c)(1),
(2), (4) Date: Mar. 31, 2005

(87) PCT Pub. No.: WO2004/038248

PCT Pub. Date: May 6, 2004

(65) Prior Publication Data

US 2006/0032721 A1    Feb. 16, 2006

(30) Foreign Application Priority Data

Oct. 19, 2002   (DE) ................ 102 48 829

(51) Int. Cl.
*F16D 25/08* (2006.01)
*F16D 28/00* (2006.01)

(52) U.S. Cl. ............... 192/84.6; 192/84.7; 192/85 C; 192/94; 192/30 W

(58) Field of Classification Search .......... None
See application file for complete search history.

(56) References Cited

U.S. PATENT DOCUMENTS

| 3,039,758 A | * | 6/1962 | Gratzmuller ............. 267/176 |
| 4,685,344 A | | 8/1987 | Horn et al. |
| 4,812,723 A | | 3/1989 | Shimizu |
| 4,895,236 A | | 1/1990 | Sakakibara et al. |
| 5,024,638 A | | 6/1991 | Sakakibara et al. |
| 5,199,325 A | * | 4/1993 | Reuter et al. ................. 74/335 |
| 5,267,635 A | * | 12/1993 | Peterson et al. ............. 192/90 |
| 5,313,852 A | * | 5/1994 | Arena ....................... 74/89.35 |
| 5,680,916 A | | 10/1997 | Borschert et al. |
| 6,050,379 A | | 4/2000 | Lyon |
| 6,269,926 B1 | * | 8/2001 | Lemoine et al. ........... 192/84.6 |
| 6,457,783 B1 | * | 10/2002 | Schanzenbach et al. . 303/115.2 |
| 6,595,338 B2 | * | 7/2003 | Bansbach et al. ......... 192/85 C |
| 6,848,557 B2 | * | 2/2005 | Kapaan et al. ............. 192/84.6 |

FOREIGN PATENT DOCUMENTS

| DE | 38 43 989 A1 | 7/1989 |
| DE | 42 10 927 C1 | 4/1993 |
| DE | 43 20 205 A1 | 12/1994 |
| DE | 44 33 824 C2 | 10/1996 |
| DE | 696 13 493 T2 | 6/2002 |
| EP | 0 177 702 A1 | 4/1986 |
| GB | 2 279 125 A | 12/1994 |
| WO | WO-01/88402 A1 | 11/2001 |

* cited by examiner

*Primary Examiner*—Richard M Lorence
(74) *Attorney, Agent, or Firm*—Davis Bujold & Daniels, P.L.L.C.

(57) ABSTRACT

An actuating device (18) or a clutch (16) of a motor vehicle (2) comprising one electric motor (34), one gearing (36, 40, 42, 44) which converts rotational motion of the electric motor (34) into a translatory motion and one accumulator (52). The converter gearing comprises one recirculating ball spindle (44). The accumulator (52) is at least partly situated within the recirculating ball spindle (44), and at least parts (58, 60) of a displacement sensor (56) are situated within the recirculating ball spindle (44).

6 Claims, 2 Drawing Sheets

ACTUATING DEVICE FOR A CLUTCH

This application is a national stage completion of PCT/EP2003/011280 filed Oct. 11, 2003 which claims priority from German Application Serial No. 102 48 829.0 filed Oct. 19, 2002.

FIELD OF THE INVENTION

The invention concerns an actuating device for clutches.

BACKGROUND OF THE INVENTION

Vehicles equipped with automated transmissions and automated clutches have been on the market for a long time. Preferred fields of use here are commercially used vehicles such as passenger cars, vans or trucks. In the recent past, passenger cars used in sports or light cars have been increasingly equipped with such transmissions or clutches. The aim is to relieve the driver from gear changes and altogether make a more comfortable and reliable operation possible. Vehicles with those transmissions usually have two pedals; an accelerator pedal and a brake pedal. The clutch pedal can be eliminated. In the vehicle, a selector switch is available for choosing the mode of operation. It is possible to select among an automatic mode, a manual selector mode and reverse gear. If the automatic mode is chosen, the ratio is automatically adapted. Different solutions exist for the automation of transmissions and clutches, especially in the field of commercial vehicles. There are different alternatives such as pneumatic, hydraulic or purely electric systems. Which alternative to select essentially depends on the kind of vehicle and on the types of energy available in said vehicle. The power requirement of the actuators used is another important parameter. Depending on the system, there are used as actuators pneumatic or hydraulic cylinders or electric motor which, via transmissions, drive the selector and shift devices and the actuating devices for the clutch. Actuators which are driven by electric motors constitute constructions which are especially favorable because of their cost.

Accumulators needed in the clutch operation for power assistance combined with the use of a recirculating ball spindle as driving element are usually situated close to the recirculating ball spindle or surrounding the recirculating ball spindle. If the accumulator is placed next to the recirculating ball spindle, the power has to be reversed by means of levers. But if the accumulator surrounds the recirculating ball spindle, then the diameter of the recirculating ball spindle takes a predominant part in the dimensional layout of the accumulator given by the spring internal diameter. The former solutions where displacement sensors are combined with recirculating ball spindles give the impression that the displacement sensor must be disposed parallel with the recirculating ball spindle or in a parallel position relative to another part. If the displacement sensor is disposed parallel with the recirculating ball spindle, additional space is needed and the mounting of the transmission means such as the magnet is difficult. If the displacement sensor is disposed parallel with another part, the part has to be in the same operational axis as the recirculating ball spindle. Thereby the installation space needed for the construction is lengthened.

DE 44 33 824 C2 has disclosed, by way of example, one actuating device for a friction clutch of a motor vehicle which has one drive mechanism and one crankshaft gear that converts the movement of the drive shaft thereof to an essentially translatory movement of an output element. The crankshaft gear is designed as a worm gear with one worm sitting upon the drive shaft and meshing with one tooth segment of one segment gear wheel rotatably supported in one housing. On the segment worm gear wheel laterally engages one preload element with one spring device. The spring device springs back under expansion out of a predeterminable dead center position, whereby the releasing direction is in such a manner being selected so that the tension has at least one essential component in deflection direction of the contact spring of the friction clutch which can be deflected from its operative position by the output element, designed as a hydraulic master cylinder, via a slave cylinder (not shown). Thereby the spring device of the preload element assists, as accumulator, the drive mechanism during the movement thereof so that the drive mechanism can be designed as relatively low-powered.

The problem on which the invention is based is to arrange the accumulator in a space-saving manner in an actuating device.

SUMMARY OF THE INVENTION

An actuating device for a clutch of a motor vehicle comprises one electric motor, one gearing, which converts the rotation motion of the electric motor to a translatory motion, and one accumulator. According to the invention, the converter gearing comprises one recirculating ball spindle and within the recirculating ball spindle the accumulator is at least partly located. To that end, in a preferred embodiment, the recirculating ball spindle is of a hollow design. The accumulator advantageously comprises at least one coil spring but, in an alternative design, the accumulator can also be formed by several coil springs, one development then having the multiple coil springs radially lying within each other. The external diameter of the coil spring or of the accumulator is preferably essentially equal to the internal diameter of the recirculating ball spindle. In one advantageous development, the recirculating ball spindle forms the master cylinder in a clutch actuated by a fluid and which comprises one master cylinder for the fluid on the actuating device, one slave cylinder for the fluid on the clutch and one fluid pipe lying therebetween. Hydraulic oil or air is considered as fluid. In a especially preferred design of the invention at least parts of a displacement sensor are situated within the recirculating ball spindle. The unused space between the springs or, depending on the power support in the oil bath or in the air pressure chamber, serves this purpose.

The use of a hollow recirculating ball spindle for accommodating parts of a an actuating device to be operated with the recirculating ball spindle, especially of an actuating device for the clutch of a vehicle, appropriately represents the advantages of the invention.

By means of the proposed development, the power-supporting accumulator is entirely or at least partly displaced in the interior of the spindle. The accumulator can be of a smaller design and a lever relay arm for deflecting the power can be eliminated. Since the accumulator now no longer engages on the surface of the recirculating ball spindle, other functions can act from outside upon the recirculating ball spindle or upon the prolongations thereof. These can be, for example, torsional and displacement sensors, bearings or sealing elements.

BRIEF DESCRIPTION OF THE DRAWINGS

The invention will now be described, by way of example, with reference to the accompanying drawings in which.

DETAILED DESCRIPTION OF THE INVENTION

Figure 1:
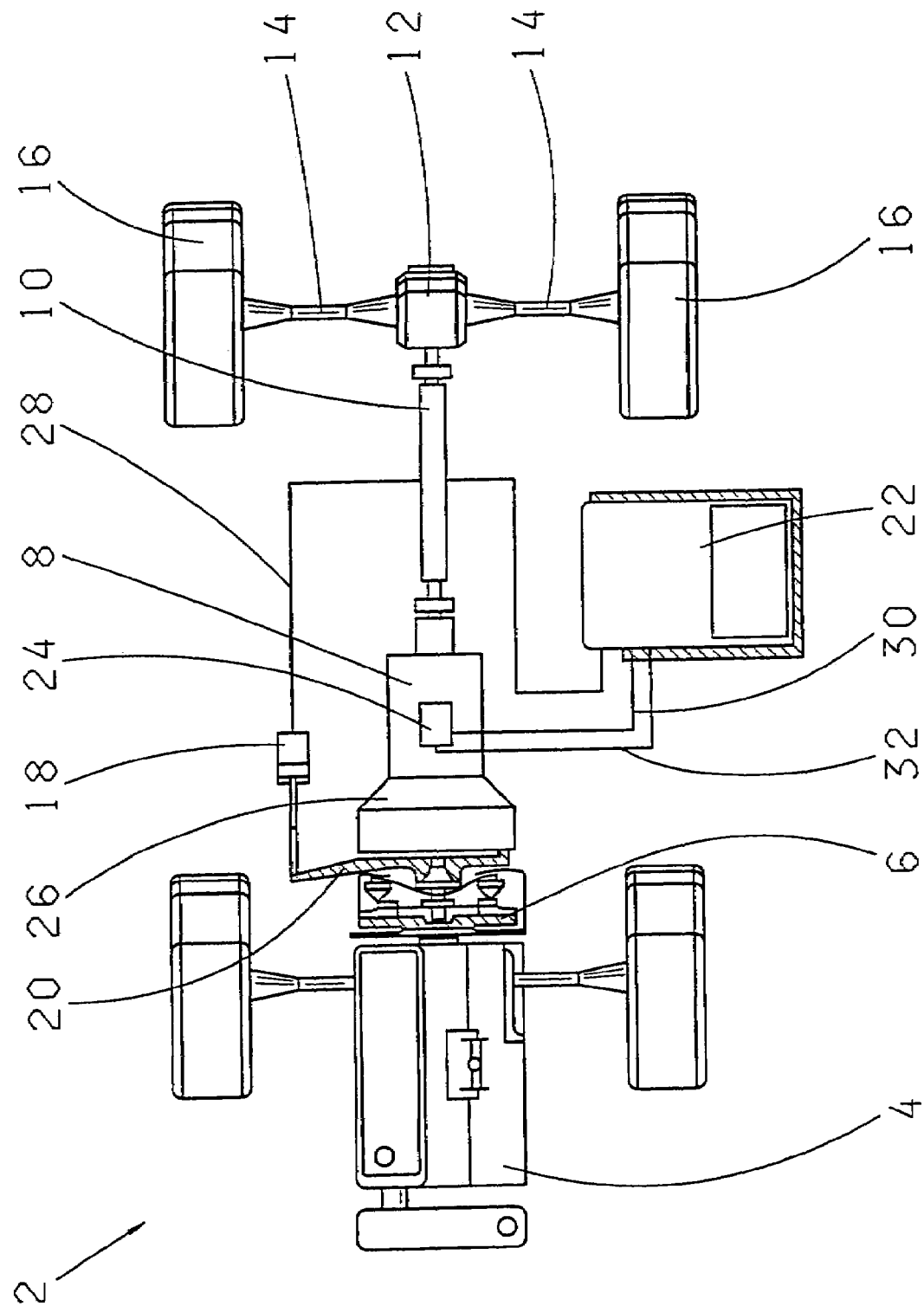
FIG. 1 is a diagrammatic graph of a vehicle.

FIG. 1 shows a diagrammatic graph of a vehicle 2 having one prime mover 4 which acts via a friction clutch 6 upon one gearing 8. The gear 8 is connected via one drive shaft 10 with one differential 12 which, via a half axle 14, drives a vehicle wheel 16. The friction clutch 6 is actuated by an actuating device 18 of a clutch adjusting device 20 connected via one line 28 with a module 22. The gearing 8 is actuated by a transmission actuator 24 of a shifting device which is situated on a housing 26 of the gearing 8 and via one control cable 30 is connected with the module 22 for performing a selector motion and via a control cable 32 for performing a shift motion.

Figure 2:
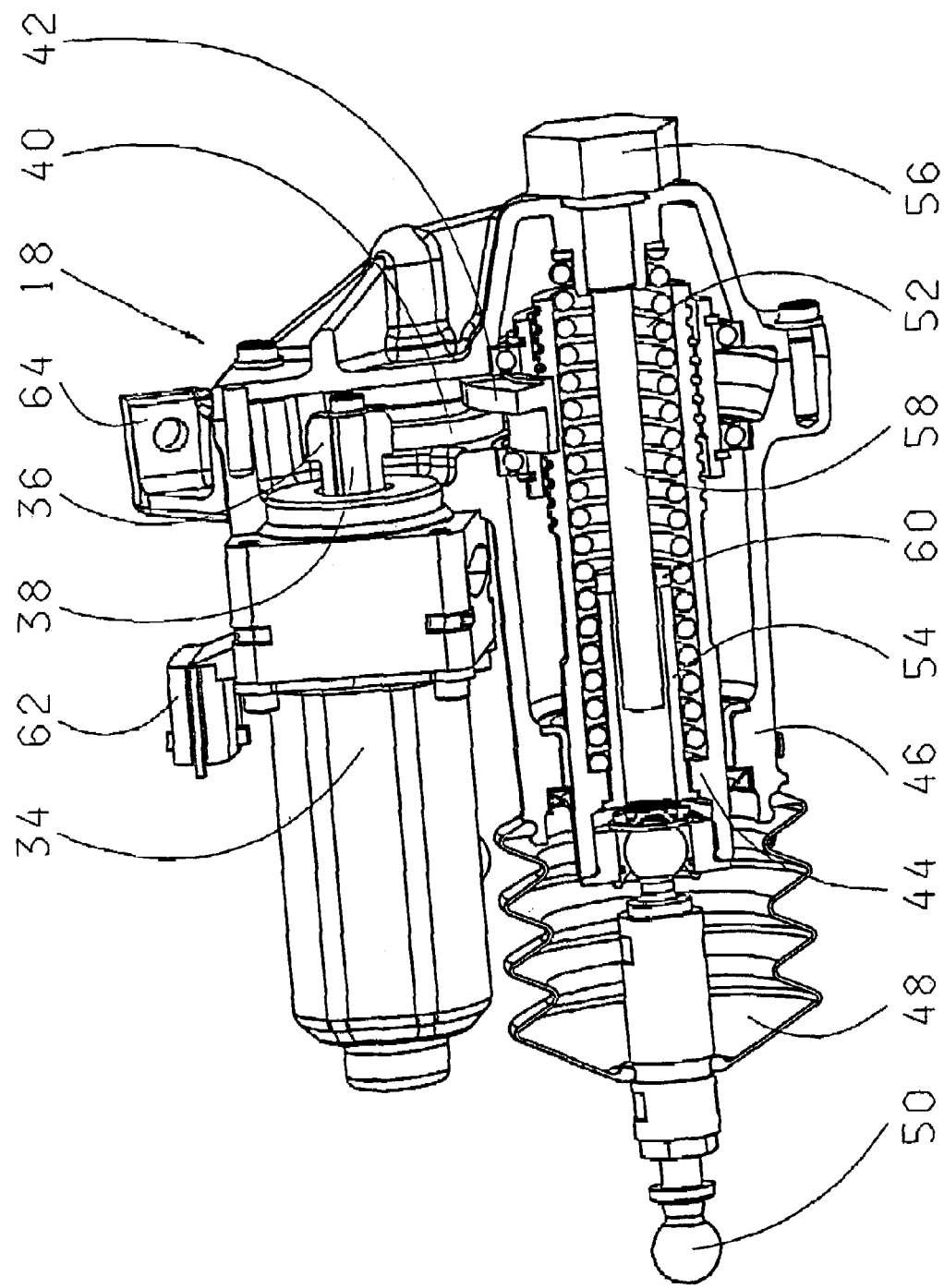
FIG. 2 is an actuating device partly in section.

The actuating device, shown in FIG. 2, has one electric motor 34, which with a gear wheel 36 upon its output shaft 38, drives a spindle nut 42 via an intermediate wheel 30. The electric motor 34 is connected via a connecting plug 62 with the module 22 from where it draws its energy supply and its control commands. The electric motor 34 or the actuating device 18 is provided with a housing flange 64 which is connected with the gearing 8 or any other body part of the vehicle 2.

The spindle nut 42 is supported outside upon a hollow recirculating ball spindle 44. The recirculating ball spindle 44 is located in a housing part 46 of the actuating device 18 which has a rubber bellows 48 on one end where an adjusting rod 50 is sealed and axially movably accommodated. The adjusting rod 50 is connected with the recirculating ball spindle 44 and during axial motion thereof is axially displaced therewith thus being able to actuate the clutch adjusting rod 20.

Within the recirculating ball spindle 44, one coil spring 52 is provided as an accumulator; the external diameter of which substantially corresponds to the internal diameter of the hollow recirculating ball spindle 44. One sleeve 54 fastened in the recirculating ball spindle 44 and with its outer surface fixing the coil spring 42 between itself and the recirculating ball spindle 44, houses on its inner side the sensor peak 58 of a displacement sensor 56. The sensor peak 58 penetrates through a sensor magnet 60 situated on the sleeve 54. When the recirculating ball spindle 44 moves, the sleeve 54 and the sensor magnet 60 moves along on the sensor peak 58. These movement signals are received in the displacement sensor 56 and relayed to the module 22.

REFERENCE NUMERALS 2 vehicle
4 prime mover
6 friction clutch
8 gearing
10 drive shaft
12 differential
14 half axle
16 vehicle wheel
18 actuating device
20 clutch adjustment device
22 module
24 transmission actuator
26 housing
28 pipe or line
30 control cable
32 control cable
34 electric motor
36 gear wheel
38 output shaft
40 intermediate wheel
42 spindle nut
44 recirculatating ball spindle
46 housing part
48 rubber bellows
50 adjusting rod
52 coil spring
54 sleeve
56 displacement sensor
58 sensor peak
60 sensor magnet
62 connecting plug
64 housing flange

The invention claimed is:

1. A method of actuating a clutch of a motor vehicle by utilization of a hollow recirculating ball spindle (44), wherein the clutch (6) is located between a prime mover (4) and a gearing (8) of the motor vehicle (2), the method comprising the steps of:
converting a rotational motion of an electric motor (34) into linear motion of a recirculating hollow ball spindle (44) by a gearing (36, 40, 42, 44), and
actuating the clutch (6) with the linear motion of the recirculating ball spindle (44) assisted by additional power provided by an accumulator (52) positioned at least partially inside the hollow ball spindle (44).

2. An actuating device (18) for a clutch (6) of a motor vehicle (2) with the clutch (6) being situated in a housing located between a prime mover (4) and a vehicle transmission (8), and the actuating device comprising:
an electric motor (34) driving a gearing (36, 40, 42, 44) rotating a hollow recirculating ball spindle (44) for converting rotational motion of the motor (34) into linear motion of the recirculating ball spindle (44) for actuation of the clutch;
the recirculating ball spindle (44) being connected to the clutch and an accumulator (52) biasing the recirculating ball spindle (44) to provide additional power assistance besides the electric motor to actuate the clutch (6); and
wherein the accumulator is positioned at least partially inside the hollow recirculating ball spindle (44) between the housing and a first end of the recirculating ball spindle (44).

3. The actuating device (18) according to claim 2, wherein the accumulator comprises at least one coil spring (52).

4. The actuating device (18) according to claim 2, wherein an external diameter of the accumulator (52) is essentially equal to an internal diameter of the recirculating ball spindle (44).

5. The actuating device (18) according to claim 2, wherein in a fluid-actuated clutch (6) between the prime mover (4) and the first gearing (8), which comprises one master cylinder for the fluid on the actuating device (18), one slave cylinder for the fluid on the clutch (6) and one fluid pipe therebetween, the recirculating bail spindle (44) forms master cylinder.

6. The actuating device (18) according to claim 2, wherein within the recirculating ball spindle (44) are situated one or more parts (58, 60) of one displacement sensor (56).

* * * * *